F. GAUTZSCH, Jr.
DIRECTION SIGNAL FOR MOTOR VEHICLES.
APPLICATION FILED MAY 10, 1913.
1,100,427.
Patented June 16, 1914.
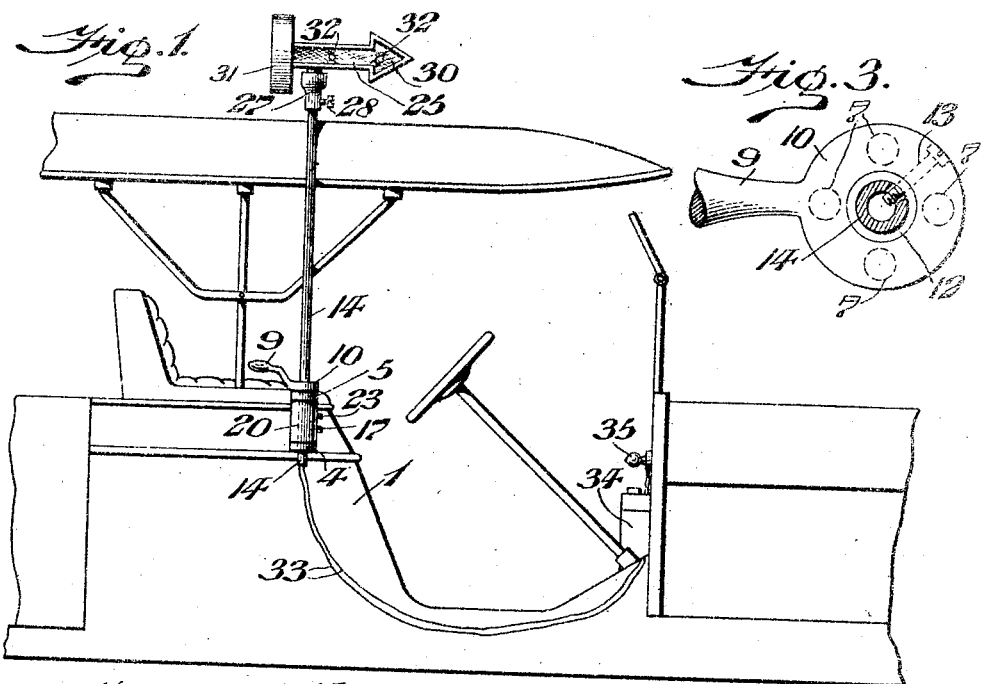
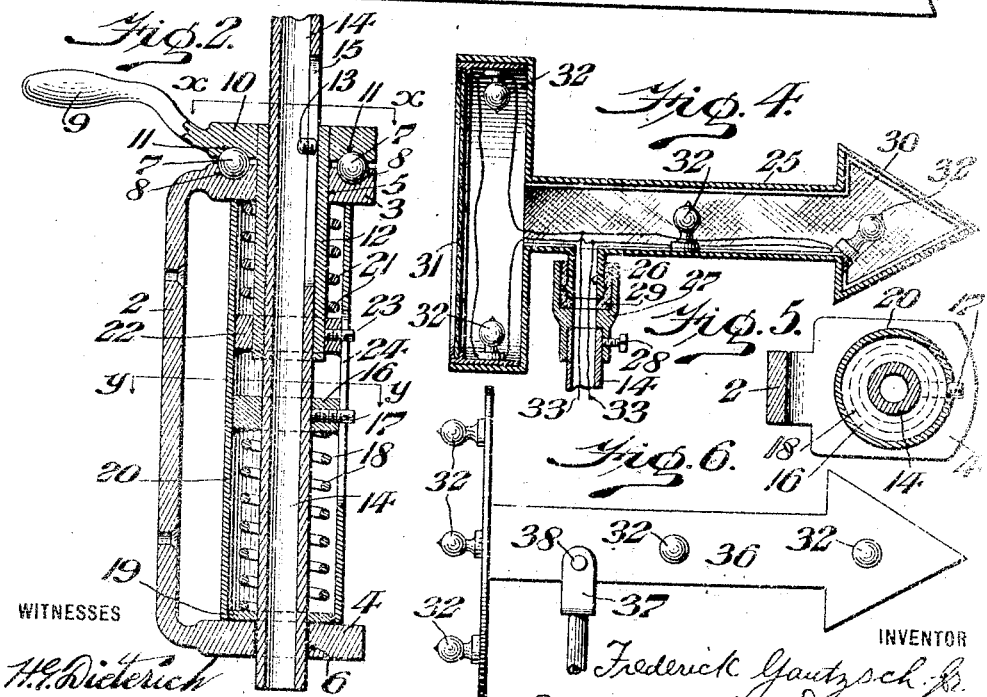

UNITED STATES PATENT OFFICE.

FREDERICK GAUTZSCH, JR., OF PHILADELPHIA, PENNSYLVANIA.

DIRECTION-SIGNAL FOR MOTOR-VEHICLES.

1,100,427.  Specification of Letters Patent.  Patented June 16, 1914.

Application filed May 10, 1913. Serial No. 766,690.

*To all whom it may concern:*

Be it known that I, FREDERICK GAUTZSCH, Jr., a citizen of the United States, residing in the city and county of Philadelphia, State of Pennsylvania, have invented a new and useful Direction-Signal for Motor-Vehicles, of which the following is a specification.

This invention relates to signal or indicating devices for use in connection with vehicles and has particular reference to such devices as applied to motor vehicles and the like.

It has for an object to provide a signal or indicating device which will serve as a notice or warning to drivers of other vehicles of the intentions of the driver of the vehicle to which the said device is attached. Thus for example, if the vehicle by which it is carried is to make a sudden turn in one direction or the other, my novel mechanism will be actuated to set an indicating device so that immediately others will be warned of the intended movement.

It has for a further object to provide a shock absorbing mechanism as a supporting means for the indicating device, so that the latter is not subjected to the more or less violent vibrations or shocks received by the vehicle in passing over the highways.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a portion of a vehicle showing the signal mechanism embodying my invention in operative position thereon. Fig. 2 represents a vertical section of the control mechanism for my novel signal device. Fig. 3 represents a section on line $x$—$x$ of Fig. 2. Fig. 4 represents a vertical section of the indicating portion of my signal mechanism. Fig. 5 represents a section on line $y$—$y$ of Fig. 2. Fig. 6 represents a side elevation of a modified form of indicating device.

Similar numerals of reference indicate corresponding parts in the figures.

Referring to the drawings, 1 designates the body of a vehicle such as an automobile or the like to which is secured the bracket 2 supporting the control mechanism for my signal indicating mechanism, the said bracket being mounted at any convenient point for the use of the operator of the vehicle. In the present instance, the bracket 2 is provided with laterally projecting ears 3 and 4 the former being provided with an opening 5 therethrough while the latter is provided with the opening 6.

7 designates loose ball members each of which is seated in a pocket or bearing cup 8 formed in the upper surface of the ear 3 and as here shown I have preferred to employ four of these ball members which are preferably arranged at 90° intervals with respect to each other and serve not only as bearings for certain rotatable parts but also definitely fix the position of the signal or indicating device.

9 designates a hand or operating lever having an apertured body-portion or collar 10 provided with countersunk recesses 11, which are arranged in the same relation to each other as are the ball members 7 and are adapted respectively to seat upon the said ball members, as will be apparent from Fig. 2.

12 designates a sleeve fixed to the body portion 10 by means of a screw 13 or like fastening device and mounted in the opening 5 of the ear 3, the arrangement being such that the sleeve projects a suitable distance below the said ear 3 and it will of course be understood that the said sleeve moves with and forms a part of the operating lever 9 and its adjuncts.

14 designates a tubular spindle mounted within the sleeve 12 and extending at its lower end through the opening 6 of the ear 4 by which construction it is permitted a sliding movement within the aforesaid parts which form guides therefor. As here shown, the spindle 14 is provided with a longitudinally disposed slot 15 which receives the inner end of the screw 13 and since the said screw forms a part of the rotatable lever member 10, the rotation of the latter will cause the tubular spindle 14 to turn in a corresponding manner.

16 designates a collar which is adjustably secured to the spindle 14 by means of the set screw 17, the said collar forming an abutment for one end of a spring 18, the opposite end of which bears against a follower 19 on the base of the exterior casing 20 which is rotatably retained between the ears 3 and 4 of the bracket 2. It will be noted that the casing 20 is interposed between the ears 3 and 4 and serves to inclose and protect certain parts of the control mechanism. It will be apparent from the foregoing construction that the spindle 14 is supported directly by the spring 18 and is thereby relieved of shocks or jars transmitted from the vehicle body and, in fact, the said spindle becomes substantially a floating support.

When the screw 17 is loosened, the collar 16 is released from the spindle 14, and said screw may be moved up and down in the slot 24 of the casing 20 relative to the spring 18 to adjust the position of said spindle. Then said screw is tightened, the collar being thereby clamped again to the spindle, when said collar and consequently the spindle rides on said spring.

In order to maintain the lever body 10 in correct operative relation to its adjuncts, I preferably employ a spring 21 which is here shown as encircling a portion of the sleeve 12 and bearing at one end against the ear 3, while its other end abuts and is seated upon a collar 22 secured to the said sleeve 12 by means of a set screw 23 or like fastening device. In order that the two collars 16 and 22 may be easily adjusted, I have provided a slot 24 in the casing 20 which slot receives the set screws 17 and 23, whereby the heads of the same are conveniently accessible, so as to be loosened by a suitable wrench so as to release the collars and permit the latter to be adjusted in position, after which said screws are tightened and the collars retain their positions.

It will be noted that the spring 18 which bears against the collar 16 secured to the spindle 14, and the base of the casing 20, allows said spindle to vibrate up and down and so yield to shocks, preventing the latter reaching and injuring the index finger, while the spring 21 which bears against the collar 22 secured to the sleeve 12, and the upper ear 3, presses down the collar 10 and holds it on the balls 7 in either the raised or lowered position of said collar.

In the present embodiment of my invention the spindle 14 is extended vertically a sufficient distance to bring the signal indicating device above the top of the vehicle in which position it may be easily seen and its position observed. This signal indicating device preferably comprises a casing 25 having the contour of an arrow and provided with a tubular boss 26 which is connected with the spindle 14 by means of a suitable coupling 27. As here shown, the coupling 27 is secured to the spindle 14 by means of a set bolt 28 while the boss 26 is secured to the coupling 27 by setting it in a suitable composition 29.

In the preferred embodiment of my invention, opposite sides of the casing 25 are formed of transparent material 30 while one end thereof is also closed by a plate of transparent material 31 so that when the device is in use at night the incandescent lights 32 contained within the casing 25 will illuminate the signal and be visible from all sides of the vehicle. The lamps 32 are connected in circuit by conductors 33 which are carried through the hollow spindle 14 and terminate at a battery and switch box 34 located on the dashboard within easy reach of the operator.

35 designates a dashlight in the same circuit with the lamps 32 which serves to indicate to the user of the vehicle whether or not the lamps in the signal 25 are lighted at the desired time.

In Fig. 6, I have shown a modified construction wherein the signal casing is dispensed with and simply an indicating device of arrow form 36 is employed upon which the lamps 32 are directly mounted. In this form a coupling 37 is employed which is provided with a bifurcated end 38 in which the signal 36 is seated and it will be understood that the lower portion of the coupling is directly connected to the spindle 14.

In the operation of the device the parts are normally in the position shown in Fig. 1 where the vehicle is supposed to be moving forward on a straight road. Under these conditions, if it is the intention of the operator to turn the vehicle either to the right or to the left, the lever 9 is first shifted in the direction desired which action raises the body portion 10, so that the ball members 7 are removed from the recesses 11. The partial rotation of the lever 9 also rotates the spindle 14, since the parts are connected as already described by the screw 13 projecting into the slot 15 and as soon as the lever 9 has been moved through the proper angle the countersunk recesses 11 again come into alinement with the balls 7 and the spring 21 causes the parts to snap into position which action of course notifies the operator that the signal has reached the proper position. Hence it will be seen that if the vehicle is to turn to the right the indicating device 25 will now be pointing to the right and visible both from the front and rear of the vehicle thus warning others of the contemplated movement. At night the circuit for the lamps 32 is closed and the signal becomes an illuminated one which will indicate the direction the same as in the daytime.

It will now be apparent that I have devised a complete unitary device for signaling purposes in connection with motor venicles or the like and embodying as a novel feature of the combination a floating mechanism for carrying the indicating means, whereby the latter is not subjected to the shocks caused by irregularities in the road or causes of a like nature all of which in my novel construction are substantially absorbed by the spring mechanism carrying the signal spindle.

Having thus described my invention, what I claim as new and desire to secure by Letters Patent, is:—

1. In a device of the character stated, the combination of a bracket adapted to be secured to a vehicle body, a spindle rotatably mounted on said bracket, a signal device carried by said spindle, a collar provided with a lever having connection with said spindle for transmitting movement thereto, resilient means between said spindle and said bracket whereby said signal device is in substantially floating relation with said vehicle, ball bearings and locking devices interposed between said collar and bracket, and auxiliary resilient means for holding said collar movably in engagement with said ball bearings and locking devices.

2. In a device of the character stated, the combination of a bracket adapted to be secured to a vehicle body, apertured ears carried by said bracket, one of said ears having a plurality of hemi-spherical recesses therein, balls in said recesses, a rotatable collar on said recessed ear, an operating lever on said collar, the latter having a plurality of hemi-spherical recesses therein to receive said balls, resilient means for retaining said collar in contact with said balls, a spindle rotatably mounted in said ears, means to transmit movement of said lever to said spindle, a signal device carried by said spindle, and shock absorbing means interposed between said bracket and said spindle.

3. In a device of the character stated, the combination of a bracket adapted to be secured to a vehicle body, apertured ears carried by said bracket, one of said ears having a plurality of recesses therein, a loose ball forming a bearing, and a locking device mounted in each recess, an operating lever, a collar thereon having recesses each to receive its respective balls, means to yieldingly maintain said collar in contact with said balls, a spindle rotatably mounted in said ears, means to transmit movement of said collar to said spindle, a signal device carried by said spindle, shock absorbing means interposed between said bracket and said spindle, and means to illuminate said signal.

4. In a device of the character stated, the combination of a vertically disposed bracket adapted to be secured to a vehicle body, apertured ears carried by said bracket, a spindle rotatably mounted in said ears, a signal device mounted on said spindle, a rotatable collar on the upper ear of said bracket, a sleeve pendant from said collar, said spindle being freely mounted in said sleeve, abutments respectively on said sleeve and spindle, separately acting springs interposed respectively between the abutment on said sleeve and the upper ear of said bracket and between the abutment on said spindle and the lower ear of said bracket, a locking device for said collar, and means for illuminating said signal device.

5. A bracket with ears on the terminals thereof, a casing interposed between said ears, a vertically movable sleeve within said casing, a vertically movable spindle within said sleeve, separate abutments within said casing encircling respectively said sleeve and spindle, a collar above the upper ear, the same being connected with said sleeve, said collar and upper ear having recesses therein, and balls freely occupying said recesses, and a plurality of springs in said casing, one of said springs resting on the upper abutment and bearing against the upper ear, and the other spring resting on the base of said casing and bearing upwardly against the lower abutment.

6. A bracket with ears on the terminals thereof, a casing interposed between said ears, a vertically movable sleeve within said casing, a vertically movable spindle within said sleeve, separate abutments within said casing encircling respectively said sleeve and spindle, a collar above the upper ear, the same being connected with said sleeve, said collar and upper ear having recesses therein, and balls freely occupying said recesses, and a plurality of springs in said casing, one of said springs resting on the upper abutment and bearing against the upper ear, and the other spring resting on the base of said casing and bearing upwardly against the lower abutment, said casing having a vertical slot therein, securing screws on said abutments, the same freely occupying said slot in the casing, said spindle having a vertical slot therein, and a securing screw on said collar, the same freely occupying said slot in the spindle.

7. In a direction signal of the character stated, a signal-carrying spindle, upper and lower bearings in which said spindle is freely mounted in vertical direction, an abutment fixed to said spindle, a resilient device interposed between said abutment and one of said bearings of the spindle below said abutment adapting said spindle to vibrate freely in vertical direction in said bearings, a sleeve in which said spindle is freely movable, an abutment on said sleeve, means for supporting said sleeve on the upper bearing, and a resilient device interposed between the last named abutment and said upper bearing and engaging the same.

8. In a direction signal of the character stated, a signal carrying spindle, upper and lower bearings in which said spindle is freely mounted in vertical direction, a collar surrounding said spindle, locking members for said collar supported on the upper bearing of said spindle, a sleeve pendant from said collar adapted to encircle freely said spindle, an abutment on said sleeve, a resilient device between said abutment and the said upper bearing for said spindle bearing against the same, an abutment on said spindle, and a resilient device between said abutment and the lower bearing for said spindle.

FREDERICK GAUTZSCH, Jr.

Witnesses:
E. HAYWARD FAIRBANKS,
C. D. McVAY.